May 30, 1944.     C. F. WOLTERS     2,350,266
FILE TRAY
Filed Aug. 21, 1943     2 Sheets-Sheet 1
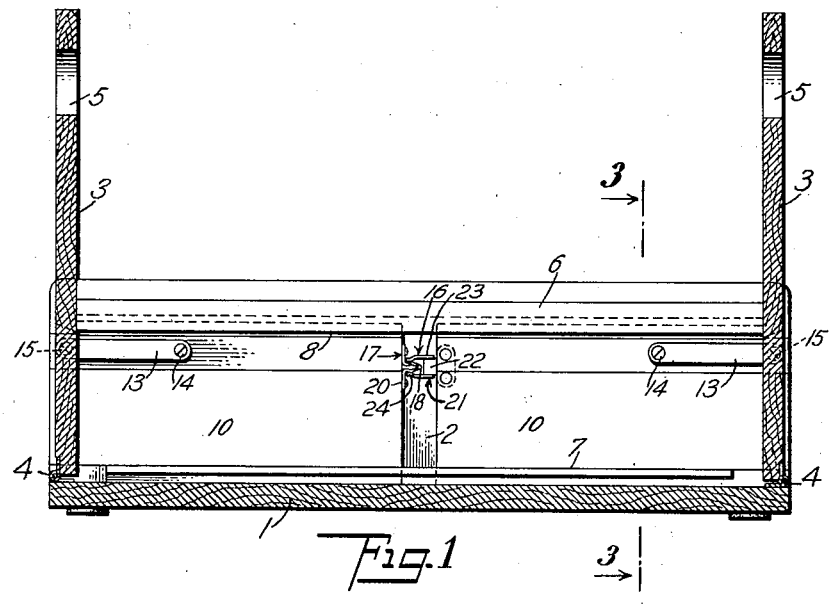
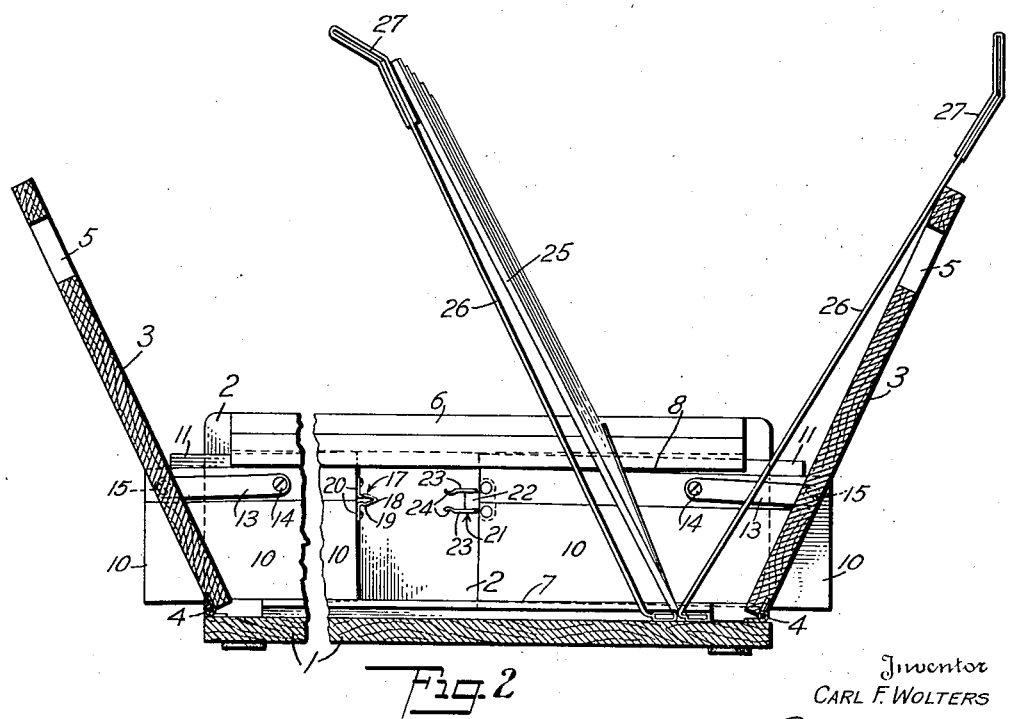
Inventor
CARL F. WOLTERS
By
Attorney May 30, 1944.　　　C. F. WOLTERS　　　2,350,266
FILE TRAY
Filed Aug. 21, 1943　　　2 Sheets-Sheet 2
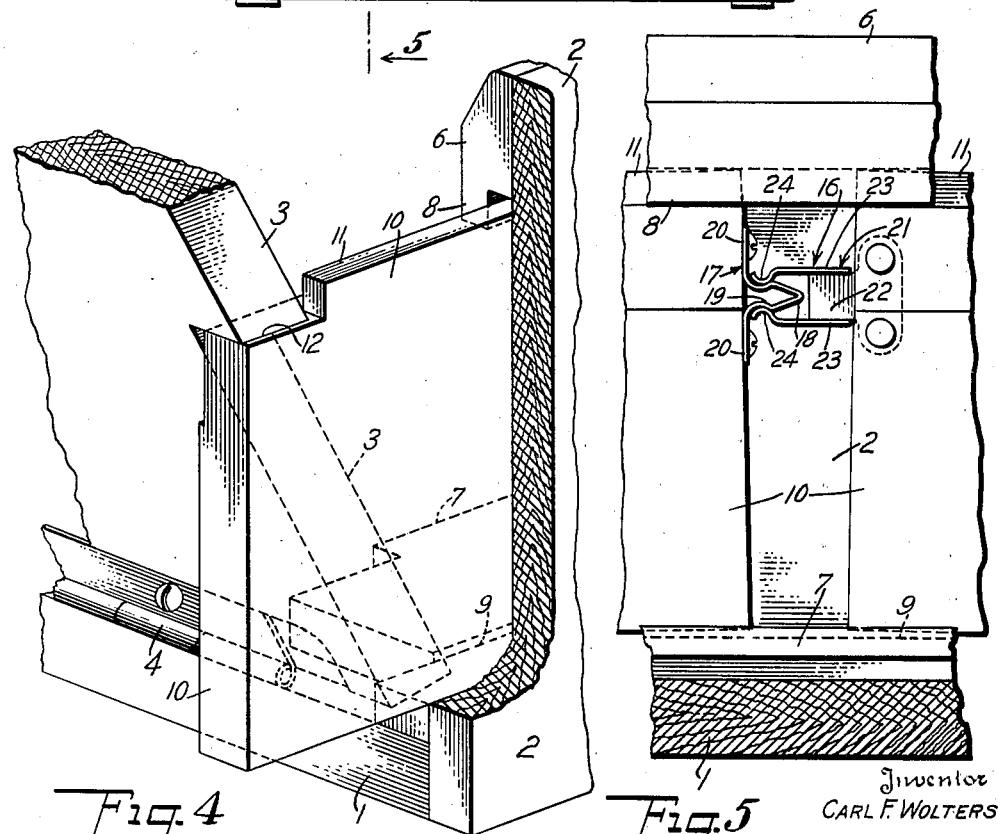
Inventor
CARL F. WOLTERS Patented May 30, 1944

2,350,266

UNITED STATES PATENT OFFICE 2,350,266

FILE TRAY

Carl F. Wolters, Kenmore, N. Y., assignor to Remington Rand Inc., Buffalo, N. Y., a corporation of Delaware Application August 21, 1943, Serial No. 499,491

4 Claims. (Cl. 129—16)

This invention relates to filing trays for ledger cards, visible index panels and the like, having tilting end walls, and particularly to a structure for supporting hinged end walls in upright and inclined positions.

The invention provides a file tray particularly adapted for manufacture from non-metallic substances, such as wood, having tilting end walls mounted on the tray for operation between upright and inclined positions to facilitate reference to the indexed and filed matter in the tray with suitable means built in the tray structure for operation to support the end walls in the upright and inclined positions.

The invention comprehends provision of slide members slidably mounted at the sides of the tray and movable to have the outer ends project beyond the ends of the tray where they engage suitable shoulders or projections on the end walls for supporting them in the inclined position and with suitable means for moving the slide members into the tray as the end walls are moved to the upright position.

The invention further comprehends the provision of suitable means for latching the slide members and end walls in the upright position, particularly means on the inner ends of the slide members interengaging in the upright position of the end walls with connecting means between the end walls and the slide members so that they are operated in unison.

In the drawings:

Fig. 1 shows the file tray incorporating the present invention in vertical longitudinal cross-section with the end walls in the upright position.

Fig. 2 is a view similar to Fig. 1 showing the end walls in the inclined position and includes the illustration of a pair of guide members and a visible index panel supported in the tray in position for reference to the indexed material on the panel.

Fig. 3 is a vertical cross-section taken on line 3—3 of Fig. 1.

Fig. 4 is an enlarged fragmentary perspective showing one side of the tray at one end with the end wall in inclined position, portions being broken away and shown in cross-section for illustrating how the slide members support the end wall in the inclined position.

Fig. 5 is an enlarged fragmentary vertical longitudinal cross-section taken substantially on the line 5—5 of Fig. 3 looking at the inside face of one side wall and showing how the latch means on the slide members cooperates in the engaged position to hold the end walls in upright position.

The present invention is designed to provide a file tray particularly adapted for construction almost entirely of wood or other non-metallic substance. The drawings disclose a preferred form of the file tray construction from wood or similar material, in which the tray has a bottom 1, side walls 2, and end walls 3 hingedly connected by hinges 4 secured to the lower ends thereof and to the ends of bottom wall 1. The end walls are mounted for hinging movement between upright and outwardly inclined positions relative to the side and bottom walls of the tray, as shown in Figs. 1 and 2. Openings 5 in the upper ends of the end walls are adapted to receive a person's hand so that the tray may be picked up for carrying from place to place and for operation of the end walls between inclined and upright positions.

Upper and lower guide and retaining bars 6 and 7 respectively, are mounted at the upper and lower edge portions of each side wall on the inner face thereof, bar 7 being also mounted on bottom 1 in the position illustrated in Fig. 3. Upper guide bar 6 is formed with a longitudinal guide flange 8 projecting downwardly from the lower edge in spaced parallel relation to the inner face of side wall 2. Lower guide and retaining bar 7 is formed with a groove 9, see Fig. 3, in the outer upper edge thereof for cooperation with the channel formed by upper guide bars 6 along the inner face of side walls 2 to provide a longitudinally extending guide channel along the inner face of each side wall opening at opposite ends of the tray.

Two slide members 10 are mounted in each guide channel in end-to-end aligned relation at opposite ends of the tray. Slide members 10 are in the form of substantially wide but relatively thin strips. These slide members have guide ribs 11 on the upper edges extending into the guideway formed by flange 8 on bar 6 along the upper inner face of side walls 2. The lower edge of each slide member is engaged in the groove 9 formed in lower bar 7 in the manner clearly illustrated in Figs. 3 and 4. In this way the slide members are retained for longitudinal sliding movement along the inner faces of side walls 2 so that they may have their outer ends extended outwardly through the open ends of the channels at the ends of the tray to an outwardly projecting position beyond the ends of side walls 2, as shown in Figs. 2 and 4.

The outer upper edges of slide members 10 in the extended position are adapted to have shoulder portions 12 formed on the opposite sides of end walls 3 engage thereon for supporting the end walls in outwardly inclined relation as shown in Figs. 2 and 4. In movement of end walls 3 between upright and inclined positions it is desired to have slide members 10 move inwardly and outwardly in the guideways at the sides of the tray. In this way slide members 10 are moved so that they lie entirely within the guideways at the sides of the tray in the upright position of end walls 3 so they will not create objectionable projections beyond the ends of the side walls. In order to secure the sliding movement of slide members 10, they have one end of links 13 pivotally connected thereto at 14 while the opposite end of each link is pivotally connected at 15 to end wall 3.

As the end walls are moved from the upright to the inclined position the motion thereof will be transmitted by links 13 to slide members 10 at opposite sides of the tray connected with the end wall being moved so that they will be moved outwardly in the guideways into the position shown in Figs. 2 and 4 when an end wall 3 reaches its outer limit of movement in inclined position. At this outer limit of movement shoulders 12 on the end walls will engage the upper edges of slide members 10 at the outer ends thereof in the manner shown in Figs. 2 and 4 and effectively support the end walls in the inclined position and prevent further tilting movement thereof.

When the end walls are moved from the inclined position as shown in Fig. 2 to the upright position as shown in Fig. 1, the slide members 10 are moved inwardly in the guideways along the side walls to the position shown in Fig. 1 where they are completely housed within the tray in the guideways in a position where the outer ends will not project beyond the ends of the side walls.

A suitable latching means is provided on the inner ends of slide members 10 at each side of the tray as indicated at 16 for latching the slide members at the inner limit of their movement for retaining end walls 3 in the upright position as shown in Fig. 1. This latching means comprises a latch projection 17 having a tapered outer end portion 18, a shoulder portion 19 and securing feet 20. Securing feet 20 are attached by screws or the like to the inner end of slide members 10 with tapered end portion 18 projecting toward the other slide member of a pair.

This latch member 17 engages with a keeper member 21 formed of a base 22 secured to a slide member 10 and carrying a pair of opposed spring arms 23 having curved inwardly directed latch fingers 24 on the free ends thereof. These fingers 24 are arranged to cooperatively engage latch projection 18 in the manner shown in Figs. 1 and 5 for holding end walls 3 in upright position.

When a pair of slide members 10 are moved toward each other in the operation of end walls 3 toward upright position, fingers 24 will first engage tapered end portions 18 of latch members 17 at opposite sides of the tray and be moved apart flexing fingers 23 outwardly. As the end members reach the upright position projections 24 will pass over shoulders 19 and engage behind said shoulders in the manner shown in Fig. 5 with spring arms 23 holding projections 24 engaged behind shoulders 19. This will effectively and automatically latch the parts of the latch means together in interengaged relation for retaining end walls 3 in upright position. This latching means operates automatically through manual operation of end walls 3 so that when they are moved apart the latch parts disengage and when the end walls are moved toward each other into upright position the latch members again interengage to retain the end walls in the upright position.

The tray illustrated in the drawings is adapted to be filled with a plurality of conventional card-carrying index panels 25 with the cards arranged thereon in offset overlapping relation for visible indexing. It is usually customary to separate each of the panels from the adjacent one by suitable guide plates 26 provided with index tabs 27 on the upper ends thereof. It is desirable to space the guide plates 26 apart to freely accommodate panels 25 and also to normally have them retained in the tray against detachment. Guides 26 are therefore provided with retaining members hinged on the lower ends that have the ends thereof projecting outwardly at the side edges of the guides for engagement in channels formed by inwardly extending flanges formed on the inner edges of lower guide and retaining bars 7. Panels 25 are adapted to have the lower ends seat on the upper edges of lower guide and retaining bars 7 between adjacent guides 26 in a manner that is well-known in the art. When end walls 3 are retained in the upright position as shown in Fig. 1 all of the panels and guides are retained in close adjacent relation in upright position.

When it is desired to refer to the indexes on the cards carried by panel 25 it is customary to move end walls 3 to the inclined position shown in Fig. 2 so that a pair of adjacent guides 26 may be separated to positions as shown in Fig. 2 for the inspection of the cards on a panel 25 positioned between these opened guides.

The structure of the present tray provides for the convenient and efficient housing of indexed records therein for inspection in the manner above described in which the slide members in the projected position shown in Fig. 2 effectively support end walls 3 in the inclined position and carry the weight of the guides 26 and panels 25 in the tray in an efficient manner during the use of the tray for reference to the indexes therein.

The invention claimed is:

1. A file tray comprising bottom and sides formed with longitudinally extending guideways along each side wall, end walls hinged on opposite ends for movement between upright and inclined positions, slide members slidably mounted in said guideways, one slide member at each end of each guideway in alignment with the slide member at the opposite end of said guideway, said slide members and end walls having cooperating interengaging portions for supporting said end walls on said slide members in inclined position, means connecting said end walls and slide members for sliding said slide members in said guideways back and forth with the movement of said end walls, to project the outer ends of said slide members outwardly beyond the ends of said side walls in supporting said end walls in inclined position, and latch means engaging and retaining said slide members at an inner position for retaining said end walls in upright position.

2. A file tray comprising bottom and sides, said sides having longitudinally extending guideways formed along the inner faces thereof and opening at the ends, end walls hingedly mounted on opposite ends for movement between upright and inclined positions, a pair of slide members slidably mounted in each guideway, one at each end of said tray and arranged to have the outer ends of said slide members at each end of said tray slidably move to project beyond the ends of the side walls for cooperation with portions of said end walls to support said end walls in inclined position, and means connecting the slide members at each end of said tray with the adjacent end wall for sliding movement with the swinging movement of the end walls between upright and inclined position 3. A file tray comprising bottom and sides, said sides having longitudinally extending guideways formed along the inner faces thereof and opening at the ends, end walls hingedly mounted on opposite ends for movement between upright and inclined positions, a pair of slide members slidably mounted in each guideway, one at each end of said tray arranged to have the outer ends move to project outwardly beyond the ends of the side walls for cooperation with portions of said end walls to support said end walls in inclined position, means connecting the slide members at each end of said tray with the adjacent end wall for sliding movement with the swinging movement of the end walls between upright and inclined positions, and latch means on the adjacent ends of said slide members for interengagement and cooperation to retain said end walls in upright position.

4. A file tray comprising bottom and sides formed with longitudinally extending guideways along the inside of each side wall opening at the ends of the tray, end walls hinged on opposite ends for movement between upright and inclined positions, a pair of slide members slidably mounted in each guideway adjacent the inner face of each side wall, each slide member being arranged in aligned end-to-end relation in the guideway at opposite ends of the tray, each slide member being adapted to have one end project beyond the end of the tray in one position thereof relative to the adjacent side wall, shoulders formed on said end walls for engaging the projecting ends of said slide members for the support of said end walls in the inclined position beyond the ends of said tray, a plurality of links each pivoted at one end to one end wall and at the opposite end to one of said slide members for connecting said slide members to adjacent end walls for movement of the slide members in corresponding relation with said end walls, and latch means on the inner ends of said slide members for interengagement in the innermost position of said slide members of each pair for retaining said end walls in upright position.

CARL F. WOLTERS.